Patented Nov. 9, 1937

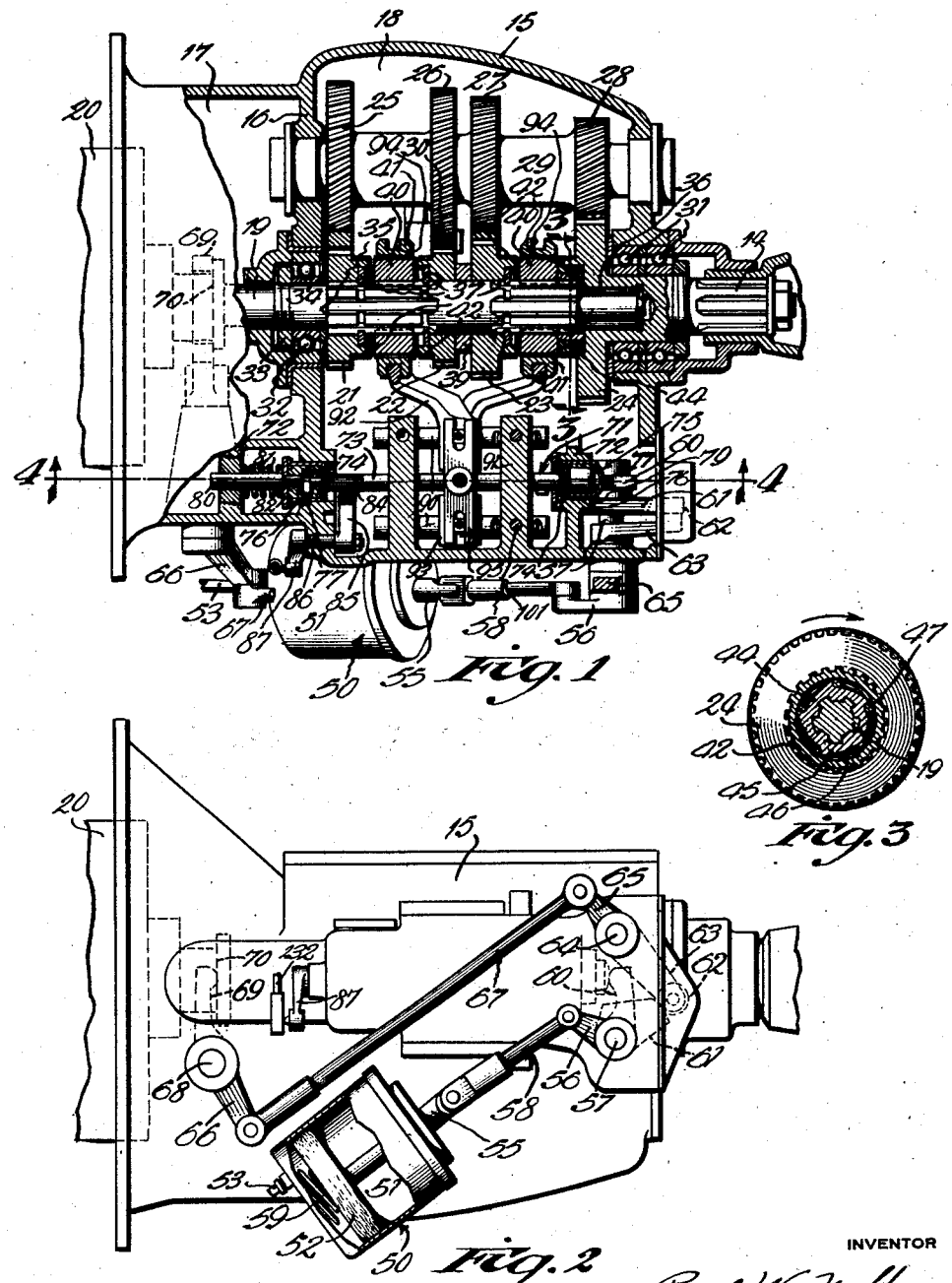

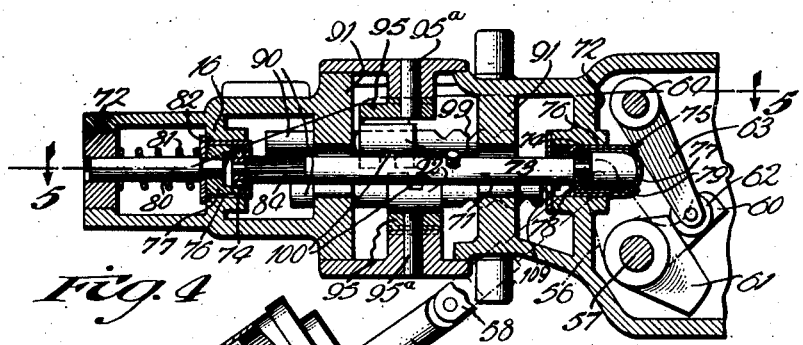

2,098,691

UNITED STATES PATENT OFFICE 2,098,691

TRANSMISSION

Paul W. Neff, Cincinnati, Ohio

Application January 19, 1934, Serial No. 707,346

13 Claims. (Cl. 192—.01)

This invention relates to transmissions and is particularly directed to a speed change transmission arrangement and improved control therefor.

The mechanism for automatically operating the clutch and changing speeds is of that type described and claimed in the patent to Paul Neff, No. 1,687,139, issued October 9, 1928.

It is highly desirable that the transmission be free of inertia as much as possible, eliminating the necessity for braking or slowing down the drive shaft for speed changing purposes as when this drive shaft is under the influence of the inertia of the countershaft. For this reason it is an object of this invention to provide an improved arrangement of the drive shaft and propeller shaft relative to the countershaft, whereby the inertia of the countershaft is not effective on the drive shaft but is effective on the propeller shaft where it is definitely controlled and counteracted by the weight of the car or the load to which the propeller shaft is connected.

In connection with the above, it is important that the drive shaft and those clutch and gear coupling parts connected thereto be kept in motion at the speed of the propeller shaft. This is true because the gear coupling means carried by the drive shaft must be in motion so as to readily engage with those gears which are under the influence of back rotation. It is also true, as is well understood, for the reason that the main clutch parts carried by the rotating drive shaft connect more readily to the clutch parts on the engine or power shaft when they are in movement. Accordingly, it is a further object of this invention to provide an overrunning clutch between the drive shaft and the propeller shaft which couples the drive shaft to the propeller shaft when the propeller shaft reaches a rate of rotation greater than that of the drive shaft, this clutch being ineffective when transmission of power is taking place from the motor.

It is a further object of this invention to provide a gear coupling mechanism which is simpler and more compact than that disclosed in the above mentioned patent, and to incorporate features of improvement in this mechanism which render it more positive in operation and less apt to cause trouble.

It is a further object to provide highly efficient control mechanisms readily actuated by the operator with the minimum of operations required, whereby the sequential operation of the transmission is controlled merely by means of the accelerator and a speed selector dial.

It is a still further object to provide for auxiliary control of the clutch and gear shifting mechanism by means of a combination brake lever and clutch and gear disconnecting lever.

Other objects and further advantages will be more fully apparent from a description of the accompanying drawings, in which:

Figure 1 is a horizontal sectional view through a transmission incorporating the present improvements.

Figure 2 is a side elevation of the transmission of Figure 1, a portion thereof being broken away for illustration of certain internal parts.

Figure 3 is a sectional view taken on line 3—3, Figure 1, detailing the overrunning clutch.

Figure 4 is a fragmentary enlarged sectional view taken on line 4—4, Figure 1, detailing the gear selector mechanism and the power shifting device.

Figure 5 is a sectional view taken on line 5—5, Figure 4, further detailing the selector mechanism.

Figure 6 is a sectional view taken on line 6—6, Figure 5, illustrating the detent devices for the selector mechanism.

Figure 7 is a sectional view taken on line 7—7, Figure 5, illustrating the arrangement of the selector fingers.

Figure 8 is a sectional view taken on line 8—8, Figure 5, illustrating the lock on the selector shaft for preventing rotation thereof when the gears are engaged.

Figure 9 is a general view showing a portion of a motor car and illustrating the complete control system of the improved gear shifting transmission of this invention.

For the purpose of adaptation and illustration, the invention has been shown incorporated in the speed change gear transmission of an automobile. This transmission is mounted in a transmission case which extends back from the motor of the automobile and includes a fly wheel or clutch compartment and gear compartment.

It is to be understood that any type of clutch mechanism can be operated by means of the apparatus of the present improvement in conjunction with the gear shifting mechanism. The clutch illustrated has a member slidable inwardly for disengagement of the clutch members for disconnecting the motor from the transmission. The clutch mechanism may be contained within the fly wheel of the motor car.

The gear box as illustrated contains the customary arrangement of gears providing for three forward speeds and a reverse. The gearing shown is of the constant mesh type, there being four sets of constantly meshing gears for accomplishing the forward and reverse speeds above mentioned.

The operation of the shifting mechanism by power is accomplished by means of a vacuum operated clutch actuating and gear shifting device which operates the clutch and shifts the selected gears in proper sequence.

Referring specifically to the drawings, the transmission casing is indicated at 15. The transmission casing incorporates an intermediate wall 16 creating a clutch compartment 17 and a gear compartment 18. A main drive shaft 19 extends to the rear from fly wheel and clutch assembly 20 and is located longitudinally of and approximately centrally of the transmission case. One gear of each set of constantly meshing gears, namely gears 21, 22, 23 and 24, are loosely mounted on the drive shaft 19. The other gears of the sets, namely gears 25, 26, 27 and 28 are fixed on a countershaft 29. In the case of the reverse speed set, namely 22 and 26, a reversing gear 30 is interposed between the gears 22 and 26. Gear 24 is formed as a part of a propeller shaft 14 and is active in the drive for all speeds and reverse. In the case of high speed, the connection from the drive shaft is direct to gear 24 without passing through the countershaft. The construction for reverse is well understood and for that reason is not fully illustrated herein.

As shown, the gears 21, 22, 23 and 24 range from small at the forward end to large at the rear end. Gears 21, 22 and 23 are loosely rotatively mounted on the drive shaft 19. The large gear 24 at the rear end is journalled in ball bearings 31, 31, which support the forward end of the propeller shaft in the casing wall. The forward end of the drive shaft is supported in a ball bearing 32 and is maintained against longitudinal displacement by means of a nut 33, screwed on a counterturned portion of the shaft engaging the inner race of the ball bearing, and a thrust washer 34 lying against a shoulder 35 of the shaft.

The rear end of the drive shaft is journalled in roller bearings 36 in an axial bore at the forward end of the propeller shaft. The gears on the axis of the main drive shaft are adapted to be coupled to the drive shaft by means of clutch or coupling mechanisms. The gears 21, 22, 23 and 24, as considered in their longitudinal arrangement, are controlled and arranged in pairs, namely, a forward pair and a rear pair, with a clutch mechanism interposed between the gear elements of each pair. The gears 21, 22 and 23 are fixed in position against longitudinal displacement by means of lock washers 37 engaged in annular grooves in the shaft. The gear 21 is held against washer 34, and gears 22 and 23 are held together against a spacer sleeve 39.

The clutch or coupling mechanism consists in each instance of a clutch block or collar 40 having splined connection with the drive shaft 19 between gears and having teeth around its outer periphery, and a longitudinally shiftable toothed clutch element 41 engaged upon the teeth of the first element shiftable thereon to either side for engagement with adjacent teeth 42 formed on the hubs of the respective gears.

It will be observed that, with propeller shaft 14 stationary, when both of the clutch elements 41 are in neutral position or centered on the clutch blocks or collars 40, the drive shaft clutch collars and shiftable clutch elements rotate as a unit and the four gears are stationary. When the forward clutch element is shifted onto the smallest gear, namely 21, on the main drive shaft, low speed ensues, the drive taking place through the gear 21 on the drive shaft axis, the large gear 25 of the countershaft, through the countershaft, and from the small gear 28 thereof to the large gear 24 on the axis of the drive shaft, this gear being in constant and direct connection with the rear axle of the motor car through the propeller shaft 14.

This forwardly disposed clutch or coupling element shifted in the opposite direction results in reverse, through the gear 22 on the axis of the main drive shaft, reverse gear 30, gear 26 on the countershaft, and thence to the rear axle as described. The other clutch element or rearmost clutch element when shifted forwardly results in second speed through gears 23, 27, to the rear axle as described. When the rearmost clutch element is shifted to the rear, the drive shaft is connected directly to the gear 24 and high speed results.

It will be noted that the countershaft is constantly in connection with the propeller shaft through constantly meshing gears 24 and 28, and accordingly the inertia of the countershaft is controlled by the propeller shaft rather than the drive shaft and clutch.

An overrunning clutch 44 is interposed between the drive shaft and the gear 24 of the propeller shaft. This overrunning clutch (see Figure 3) consists of a circular element 45 splined on the drive shaft and having cross grooves in its outer periphery providing inclined surfaces 46, a roller 47 in each cross groove and the circular element 45 fitting closely within a bore in the end of the gear 24.

When the car is in forward speeds the driving shaft moving the element 45 of the overrunning clutch will not cause a driving engagement. When the propeller shaft speed becomes greater than the drive shaft speed, the overrunning clutch is effective for coupling the propeller shaft and drive shaft through the medium of the rollers riding up the inclined surfaces and engaging the internal bore of the driven gear. This is necessary, otherwise when the clutch and gears are uncoupled, while the car is rolling, the drive shaft is free to stop rotating. In other words, since the gears 25, 26, 27 and 28 on the countershaft, and gears 21, 22, 23 and 24 on the axis of the drive shaft would be rotating at a high rate of speed or car speed, the slow moving or stationary gear coupling elements 41, 41, would have to be shifted into the fast moving gears 21, 22, 23 and 24 previous to engagement of the clutch. The overrunning clutch placed between the propeller shaft and the drive shaft overcomes this difficulty since the propeller shaft drives the drive shaft through the overrunning clutch, causing the propeller shaft and drive shaft to be driven at the same speed when the car is rolling, with the clutch and gear coupling elements disengaged. The overrunning clutch still permits the drive shaft to overrun the propeller shaft for effectuating lower speeds and the reverse.

Following the transmission of power, it will be noted that when low gear is selected the power proceeds from the drive shaft through gears 21, 25, 28 and 24. Although the drive shaft is rotating the inner part of the overrunning clutch this is of no effect since the overrunning clutch is disengaged in forward rotation. Assuming the car to be in motion and a shift being made, the gear coupling element is disconnected and accordingly different rates of speed might be taken by the propeller shaft and the drive shaft respectively if it were not for the fact that the overrunning clutch is then effective for compelling back rotation from the propeller shaft to the drive shaft. In the case of reverse, the drive shaft imparts a reverse rotation to the propeller shaft. Both of these directions of rotation act to keep the overrunning clutch out of coupling position.

The clutches of the gear transmission are actuated by a clutch and gear shifting apparatus of the following description. A vacuum or suction device 50 in the form of a cylinder 51 and piston 52 is secured on the side of the transmission casing. A suction line 53 extends between the intake manifold 54 of the motor and one end of the cylinder. This suction operated piston has its rod 55 connected to an arm 56 of a cam shaft 57 by means of a flexible link 58. The cam shaft is journalled horizontally in the side of the transmission casing. A coil compression spring 59 is included in the cylinder. This spring normally maintains the piston away from the suction end of the cylinder and permits the gear-changing outward movement of the piston under spring pressure as will be described hereinafter.

The selector mechanism is supported within the casing at one side thereof. The cam shaft carries two cams 60, 61, the first of which operates the selector mechanism for moving it to gear selecting position and the second of which disconnects the drive at the clutch. The latter cam 61 engages a roller 62 on the end of an arm 63 fixed to a stub shaft 64 journalled in the wall of the casing. Another arm 65 is fixed to the external end of the stub shaft 64 and is connected to an arm 66 by means of a link 67. The latter arm 66 is fixed on a stub shaft 68 disposed adjacent the clutch. A clutch shifting yoke element 69 is fixed to the latter shaft and is in engagement with the clutch shifting element 70 about the driving shaft axis.

The first mentioned cam 60 is active against the end of a selector rod 71 translatably mounted in support lugs 72 on the inner wall of the casing. The selector rod 71 is also rotatively mounted for reasons of selection as will be hereinafter understood. For this purpose the rod is sectional. The main section 73 of the rod has its counterturned ends journalled in ball bearings 74 fixed in a slidably mounted end portion 75 disposed through the supporting lug and the intermediate wall 16 of the casing.

The rod portion 75, which slidably supports the selector rod at the rear or contacted end of the rod, consists of a pair of telescopically engaged sleeves 76, 77, the outer 76 of which includes an internal lip 78 at its forward end overhanging the outer race of the bearing, and an internal lip 79 at its rear end peened about the rounded closed contact end of the other sleeve or thimble 77, the latter sleeve or thimble having its forward end engaging the outer race of the bearing.

The cam contacts the rounded rear end of the inner sleeve or thimble for the purpose of translating the selector rod. The forward rod section also consists of a pair of sleeves 76, 77, engaging the bearing in the same manner as that previously described. In addition, however, a stud 80 is engaged in the inner sleeve and is supported in one lug 72 of the casing. A coil spring 81 under compression is disposed about the stud between the lug 72 and a thrust washer 82 lying against the bearing sustaining elements 76, 77, described.

The selector rod 71 includes elongated teeth 84 at its forward end, which teeth are engaged by a gear segment 85 fixed to a shaft 86 journalled in the casing and having an arm 87 at its outer end which is connected as hereinafter described to a shifter lever 88 on the steering post. The elongated teeth on the rod 71 provide a splined rotative connection between the rod and the gear segment so that the rotative connection is unaffected by translative movement of the rod.

As shown in detail, Figures 3 to 6 inclusive, gear shifting rods 90 are translatively mounted in spaced supporting walls 91 of the casing in parallelism with the selector rod 71. There are four of these shifting rods, two at each side of the selector rod. The rods of each pair of rods at each side of the selector rod are mounted, one above the other. A gear shifting yoke 92 is fixed on each of those rods disposed on the side toward the gear train. An auxiliary shifting block 93 is fixed on each of the other rods.

The gear shifting yokes 92 are engaged with annular grooves 94 in the gear coupling members 41 previously described in the conventional manner. Horizontally disposed shifting levers 95 are fulcrumed on pivot pins 95ª in the casing. There are two of these pivoted shifting levers, one above and one below the rods. Each of these levers has its ends connected to a gear shifting yoke 92 and an auxiliary shifting block 93 respectively (see Figure 7). The connections to the yokes or blocks consist in each instance of a slide block 96 rotatively mounted on a vertical pin 97 fixed in the yoke or auxiliary shifting block. These guide blocks are engaged in slots 98 or bifurcated ends of the levers.

The selector rod 71 includes a radially extended pin 99 disposed adjacent the shifting yokes and blocks. This pin is positioned on the rod so that when the selector rod is moved forward to gear selecting position, it is disposed adjacent the shifter yokes and auxiliary blocks at their neutral or intermediate positions.

Each shifter yoke and auxiliary block includes a bifurcated portion 100 projected towards the selector rod, whereby the pin can be rotated into registry with any one of the bifurcations. Now it will be apparent that when the pin is engaged with a yoke and the selector rod is retracted under the force of the spring 81, the shifter yoke is moved longitudinally through a direct connection and the gear coupling element 41 is moved into its gear connecting position. On the other hand, if the pin is engaged with the bifurcation of an auxiliary block, the result is to move the shifting yoke in an opposite direction through the fulcrumed shifting lever 95.

The bifurcated ends of the shifting lever in slidable connection with the slide blocks 96 comprise flexible connections compensating for the conjoint swinging and lineal movements of the lever and the yoke element or auxiliary blocks respectively. Therefore, it will be apparent that either shifting yoke can be moved to one of two gear engaging positions depending on the rotative position of the radial pin of the selector rod. For uniformity of selector control movement the four projections of the shifter yokes and auxiliary blocks are related to each other at 90° spacing around the circumference of the rod. A detent 101 is provided for holding the rods in any one of their three positions. For this purpose there are three notches 103 in each shifter rod adapted for registry with the detent pin carried in the supporting wall of the casing.

A mechanical interlock has also been provided for preventing coupling of gears simultaneously. Through this arrangement only one auxiliary block or shifter yoke can be shifting from neutral at a time. In other words, all must be in neutral before that one can be shifted. For this purpose a ball 104 is located at the bottom of a drilled hole 105 in one of the walls, the ball in this position being between a pair of the rods. The ball is of a diameter slightly greater than the distance between the rods. The adjacent face of each rod is notched as at 106 adjacent the ball. These notches are directly adjacent when both rods are in neutral. The diameter of the ball is equal to or slightly less for clearance than the distance between the rods plus the depth of one groove. Accordingly, when one rod is shifted the ball is engaged in the notch of the other rod and no motion of the latter rod can take place. When both grooves are in registry with the ball, movement of either can take place. Therefore, the mechanical interlock is effective between the upper and lower shifting levers.

It is also provided that the selector rod 71 cannot be rotated when gears are coupled. For this purpose (see Figure 8) a radial fin 107 is provided in the rod. This fin, when the rod is retracted carrying a particular gear coupling element into effective position, engages in a particular radial groove 108 in the bore of a plate 109 fixed to the casing through which the rod passes. There are five grooves, one for each shifting position and a neutral.

Referring to Figure 9, the improved transmission with its control mechanism is shown incorporated in an automobile. The suction line 53 for the vacuum device operating the clutch and gear shifting apparatus extends to the intake manifold 54 of the motor. A valve 115 is incorporated in this suction line 53. This valve is actuated by means of the accelerator 116. The valve incorporates a body 117 and a slide valve element 118. The slide valve element 118 includes a diametric passageway 119 and a longitudinal groove 120 apart from the passageway 119.

One end of this valve element 118 is connected to a fulcrumed lever 121 by means of a link 122, this fulcrumed lever being part of the throttle mechanism for the motor. The accelerator is pivoted at its lower end in the usual manner and engages a pin 123 extended through the floor board 124 and flexibly connected to the same end of the lever 121 as the link 122. A spring 125 under tension between a bracket 126 fixed on the motor and the other end of the lever 121 maintains this lever in position when the motor is idling.

An arm 127 is pivoted on the fulcrum of the lever 121 and is connected to the arm 128, controlling the gasoline feed of the carburetor, by means of a link 129, a spring 130 urging the arm 127 toward closing position of the carburetor valve in the conventional manner. A contact screw 131 is adjustably mounted in the end of the fulcrumed lever 127. The view shows the valve, controlling the clutch controlling and gear shift device, in open position with the opening 119 connecting the respective sections of the conduit 53. In this position the accelerator is fully released and the motor is idling with the suction of the intake effective for maintaining the clutch actuating and gear shifting device in disengaged position for setting of the selector rod in a particular shift position.

Depression of the accelerator in its first phase does not effect the speed of the motor, that is, does not change the relation of the gasoline control because of the fact that a clearance is provided between the contact screw 131 and the arm 127, this clearance being sufficient for permitting registration of the exhaust groove 120 with the suction line. The moment the vacuum is relieved, the spring 59 of the suction device acts to operate the clutch control and gear control mechanism, whereby the clutch is engaged and the control cam moves clear of the selector rod, whereby the spring 81 can act to move a particular gear coupling element into gear coupling position. The dot and dash positions for the accelerator and the fulcrumed lever 121 show the positions at which these elements start to be effective for speeding up the motor.

The selector rod 73, as has been stated, is rotated for selective engagement of the pin 99 thereof with a particular element for moving the gear coupling parts. This rotation is imparted to the selector rod through a rod 132 flexibly connected to the end of the arm 87 and having its upper end connected to another arm 133, which arm is fixed to the lower end of a rotatable control shaft 134 extending either through or alongside of the steering post 135. The speed controlling finger 88 is fixed on the upper end of the shaft 134.

As shown in this general view, it has been provided that the hand brake lever indicated at 136 is effective for disengaging the clutch and returning the gear coupling elements to neutral. This is done by means of a cam portion 137 on the brake engaging a roller 138 mounted on the end of an arm 139 which is pivoted on the floor board 140. The outer end of this arm is connected to an arm 141 fixed on the cam shaft 57, the connection being in the form of a link 142.

Accordingly, following the operation of this mechanism, it will be noted that as soon as the motor is started, the clutch is automatically thrown out and the gear shifting mechanism set up. The operator moves the selector finger 88 to the desired position, such as low, intermediate, high, or reverse, and depresses the accelerator. The accelerator takes care of the normal function of the clutch pedal and automatically causes the clutch to be thrown in and permits the gears selected to be connected to the motor for putting the car in motion. Upon further depression of the accelerator the motor is speeded up in the usual manner and the car is in motion. When change to another speed is desired, full release of the accelerator slows down the motor, throws out the clutch and sets up the gear shifting mechanism uncoupling the car from the particular gear in which it has been driven. The procedure then described heretofore is again followed.

Assuming the accelerator pedal is released entirely for the purpose of a long coast, the overrunning clutch between the propeller shaft and drive shaft keeps these two elements synchronized so that a shift back into high gear is effected without clashing when the accelerator pedal is again depressed.

The normal vacuum created by the engine is used for moving the shifting mechanism to position for gear selection. Each time the accelerator is fully released there is complete disconnection of drive or power, both at the clutch and at the gears. Therefore long coasts can be made with the mechanism in what is known as freewheeling position. The overrunning clutch between the propeller shaft and drive or power shaft is highly important since it keeps these shafts running at the same speed and there is no clash when the high gears are re-engaged. Particularly is this true with the car coasting at high speed where the drive or power shaft and propeller shaft are directly coupled. This is an important feature in connection with the feature of constant connection between the countershaft and propeller shaft, providing propeller or traction control for the inertia of the countershaft and gears as heretofore described.

Having described my invention, I claim:

1. In a transmission, a propeller shaft, a clutch controlled drive shaft having its outer end axially engaged in the propeller shaft, a series of spaced gears loosely mounted on said drive shaft, a countershaft, a series of gears fixed on the countershaft, each thereof in constant mesh with a particular one of the first series, a slidable clutch means on the drive shaft for individually and selectively coupling the gears of the first series to the drive shaft, constantly meshing gears fixed on the countershaft and propeller shaft respectively, and an overrunning clutch between said propeller shaft and drive shaft for causing rotation of the drive shaft with the propeller shaft when the drive shaft tends to rotate or is being driven at a lower speed than the propeller shaft.

2. In a transmission including shiftable gear coupling elements; translatably mounted shifter yokes, connected to said gear coupling elements, translatably mounted auxiliary shifting elements, fulcrumed levers, each connecting a particular shifter yoke to a particular auxiliary shifting element, a translatable selector rod, said yokes and auxiliary elements each including a coupling portion, said portions projected toward said selector rod, means for translating said rod, means for rotating said rod to connection with any one of said coupling portions, and means for retracting said selector rod, whereby said yokes or auxiliary elements shift the gear coupling elements.

3. In a transmission including shiftable gear coupling elements; a rotatable translatable selector rod, a power device for translating said rod in gear disengaging direction, a spring for translating said rod in gear engaging direction, a selector lever for rotating said rod, said rod including a radial pin, four slidably mounted shifting elements circumferentially spaced about said rod adjacent said pin when said pin is at gear disengaging position and each including a coupling portion, said portions selectively engageable by said pin, two fulcrumed levers, each lever connecting two shifting elements, one of each of said latter elements connected to a respective shiftable gear coupling element.

4. In a transmission including shiftable gear coupling elements; translatably mounted shifter yokes, connected to said gear coupling elements, translatably mounted auxiliary shifting elements, fulcrumed levers, each connecting a particular shifter yoke to a particular auxiliary shifting element, a selector rod including a radially disposed pin, said yokes and auxiliary elements each including a coupling portion extended into the path of rotation of said pin when said pin is in selecting position, means for moving said pin to selecting position, means for rotating said pin to connection with any one of said coupling portions, and means for retracting said selector rod, whereby said yokes shift the gear coupling elements directly or said auxiliary shifting elements shift the gear coupling elements through the levers.

5. In a transmission, a drive shaft, a propeller shaft, a gear on the propeller shaft, a train of gears between the drive shaft and the gear on the propeller shaft, coupling means for selectively connecting the gears of the transmission to the drive shaft for varying speed, and an overrunning clutch interposed directly between the drive shaft and the propeller shaft for automatically connecting the drive shaft and propeller shaft, when the propeller shaft tends to overrun the drive shaft.

6. A gear transmission for an automobile including a clutch controlled power shaft, a clutch therefor, gear coupling mechanism, a power actuated device for setting up said gear shifting mechanism in position for a selective gear coupling engagement, a clutch shifting lever operated by said power actuated device in advance of the gear setting up movement, a control lever for obtaining said selective gear coupling engagement, means for retracting said gear coupling mechanism and coupling the selected gear, a brake lever for said automobile, and a connection between said brake lever and said power actuated device, through which said brake lever is operative for moving the power actuated device for throwing out the clutch and uncoupling the gears when in braking position.

7. A gear changing mechanism for an automobile, comprising, a train of gears, a power shaft for said train of gears, a clutch controlling the power to said power shaft, a fluid motor, a gear coupling device, a clutch throw-out member, a control member connected to said motor for actuating said clutch throw-out member and shifting device in a timed order, and a brake lever for said automobile, said brake lever having operative connection to said control member for actuating the same when the brake lever is set for throwing out the clutch and returning the gear shifting device to neutral.

8. A gear transmission including, a clutch controlled power shaft, a clutch therefor, a clutch throw-out lever, a propeller shaft, a train of gears between the power shaft and the propeller shaft, said gears adapted to be selectively coupled to the power shaft, an overrunning clutch between the power shaft and the propeller shaft, gear coupling mechanism, a power actuated device for setting up said gear coupling mechanism in position for a selective gear coupling, and for operating said clutch throw-out lever in advance of the gear setting-up movement, a control lever for obtaining said selective gear shifting engagement, and means for retracting said shifting mechanism and shifting said selected gear.

9. In a transmission, a clutch controlled power shaft, a clutch therefor, a propeller shaft, a train of gears between the power shaft and the propeller shaft, an overrunning clutch disposed between the power shaft and the propeller shaft, a fluid motor, a gear coupling device effective for controlling the train of gears for appropriate gear shifts, a clutch throw-out element, and a control device connected to said motor for actuating said clutch throw-out element and coupling device in timed order.

10. In a transmission, a clutch controlled power shaft, a clutch therefor, a propeller shaft, a countershaft, said propeller shaft and said countershaft in constantly coupled driving connection whereby the inertia of the countershaft is not effective on the power shaft but is effective on the propeller shaft, speed changing transmission devices, each including component gears, one of which gears is fixed on the countershaft and the other of which gears is loosely mounted on the power shaft, sliding toothed clutch couplers for the gear on the power shaft, said couplers splined on the power shaft, each gear including a toothed hub cooperating with its particular toothed clutch coupler, and a coupler for connecting the power shaft directly to the propeller shaft.

11. In a transmission, a clutch controlled power shaft, a clutch therefor, a propeller shaft, a countershaft, said propeller shaft and said countershaft in constantly coupled driving connection, speed changing transmission devices having component parts mounted on the power shaft and the countershaft respectively and each including a coupler, a coupler for connecting the power shaft directly to the propeller shaft, and an overrunning clutch between the power shaft and the propeller shaft effective for coupling when the power shaft is being driven or is rotating at a lower speed than the propeller shaft, whereby the inertia of the countershaft is not effective on the power shaft but is effective on the propeller shaft, and the power shaft will be rotated at the speed of the propeller shaft when the power is off.

12. A speed changing mechanism, comprising, a power source, a clutch controlled power shaft, a clutch therefor, a propeller shaft, a speed changing device between said shafts, a clutch throw-out member, an air operated device, a control member for actuating said clutch throw-out member and speed changing device in timed order, a connection between said air operated device and said control member, a speed control lever for said power source, a control valve for said air operated device, and a connection between said speed control lever and said valve for automatically controlling the power operation of the clutch and speed changing device.

13. A speed change transmission, including, a clutch controlled power shaft, a clutch therefor, a clutch throw-out lever, speed change gears driven by said power shaft, means for shifting said gears, a power operated device adapted to move said clutch throw-out lever and said gear shifting means in the named sequence, said gear shifting means adapted to be set up for a selected gear shift, a control lever for gear selection, means for retracting said gear shifting means for shifting said gear, an engine for driving said power shaft, a speed control lever for said engine, a power actuator having a common connection to said clutch throw-out lever and said gear shifting means, and a connection between said engine speed control lever and said common actuator means.

PAUL W. NEFF.